(12) United States Patent  (10) Patent No.: US 8,061,413 B2
Turner et al.  (45) Date of Patent: Nov. 22, 2011

(54) HEAT EXCHANGERS COMPRISING AT LEAST ONE POROUS MEMBER POSITIONED WITHIN A CASING

(75) Inventors: Terry D. Turner, Idaho Falls, ID (US); Bruce M Wilding, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 427 days.

(21) Appl. No.: 11/855,071

(22) Filed: Sep. 13, 2007

(65) Prior Publication Data

US 2009/0071634 A1  Mar. 19, 2009

(51) Int. Cl.
F28D 15/00 (2006.01)
(52) U.S. Cl. ................................. 165/104.26
(58) Field of Classification Search ............ 165/104.26, 165/104.22; 62/315, 177, 178, 180
See application file for complete search history.

(56) References Cited

U.S. PATENT DOCUMENTS

| | | |
|---|---|---|
| 1,222,801 A | 4/1917 | Rosenbaum |
| 2,037,679 A | 4/1936 | Dana |
| 2,037,714 A | 4/1936 | Gaines, Jr. |
| 2,040,059 A | 5/1936 | Mesinger |
| 2,093,805 A | 9/1937 | de Baufre |
| 2,157,103 A | 5/1939 | Zenner |
| 2,209,534 A | 7/1940 | Moore |
| 2,494,120 A | 10/1950 | Ferro, Jr. |
| 2,900,797 A | 8/1959 | Kurata et al. |
| 2,937,503 A | 5/1960 | Swearingen et al. |
| 3,132,016 A | 5/1964 | Kurata |
| 3,168,136 A | 2/1965 | Ammon |
| 3,182,461 A | 5/1965 | Johanson |
| 3,193,468 A | 7/1965 | Sprague |
| 3,213,631 A | 10/1965 | Kniel |
| 3,218,816 A | 11/1965 | Grenier |
| 3,236,057 A | 2/1966 | Hadi Hashemi-Tafreshi |
| 3,254,496 A | 6/1966 | Roche et al. |

(Continued)

FOREIGN PATENT DOCUMENTS

EP  0 676 599 A  10/1995

(Continued)

OTHER PUBLICATIONS

PCT International Preliminary Report on Patentability and Written Opinion for PCT/US2006/041039 dated Apr. 9, 2009, 7 pages.

(Continued)

*Primary Examiner* — Melvin Jones
(74) *Attorney, Agent, or Firm* — TraskBritt (57) ABSTRACT

A heat exchanger and associated methods for sublimating solid particles therein, for conveying fluids therethrough, or both. The heat exchanger includes a chamber, and a porous member having a porous wall having pores in communication with the chamber and an interior of the porous member. A first fluid is conveyed into the porous member while a second fluid is conveyed into the porous member through the porous wall. The second fluid may form a positive flow boundary layer along the porous wall to reduce or eliminate substantial contact between the first fluid and the interior of the porous wall. The combined first and second fluids are conveyed out of the porous member. Additionally, the first fluid and the second fluid may each be conveyed into the porous member at different temperatures and may exit the porous member at substantially the same temperature.

11 Claims, 3 Drawing Sheets

U.S. PATENT DOCUMENTS

| | | | |
|---|---|---|---|
| 3,289,756 A * | 12/1966 | Jaeger | 165/155 |
| 3,292,380 A | 12/1966 | Bucklin | |
| 3,312,073 A | 4/1967 | Jackson et al. | |
| 3,315,475 A | 4/1967 | Harmens | |
| 3,323,315 A | 6/1967 | Carr | |
| 3,326,453 A | 6/1967 | Kun | |
| 3,349,020 A | 10/1967 | Crownover et al. | |
| 3,362,173 A | 1/1968 | Ludwog Kneil | |
| 3,376,709 A | 4/1968 | Dickey et al. | |
| 3,406,496 A | 10/1968 | Betteridge et al. | |
| 3,407,052 A | 10/1968 | Huntress et al. | |
| 3,416,324 A | 12/1968 | Swearingen | |
| 3,422,887 A | 1/1969 | Berkeley | |
| 3,448,587 A | 6/1969 | Goard et al. | |
| 3,487,652 A | 1/1970 | McKay | |
| 3,503,220 A | 3/1970 | Desai | |
| 3,516,262 A | 6/1970 | Bernstein | |
| 3,548,606 A | 12/1970 | Kuerston | |
| 3,596,473 A | 8/1971 | Streich | |
| 3,608,323 A | 9/1971 | Salama | |
| 3,616,652 A | 11/1971 | Engel | |
| 3,628,340 A | 12/1971 | Meisler et al. | |
| 3,677,019 A | 7/1972 | Olszewski | |
| 3,690,114 A | 9/1972 | Swearingen et al. | |
| 3,724,225 A | 4/1973 | Mancini et al. | |
| 3,724,226 A | 4/1973 | Pachalay | |
| 3,735,600 A | 5/1973 | Dowdell et al. | |
| 3,846,993 A | 11/1974 | Bates | |
| 3,886,885 A | 6/1975 | Becker et al. | |
| 3,897,226 A | 7/1975 | Doherty | |
| 4,001,116 A | 1/1977 | Selcukoglu | |
| 4,004,430 A | 1/1977 | Solomon et al. | |
| 4,007,601 A | 2/1977 | Webbon | |
| 4,022,597 A | 5/1977 | Bacon | |
| 4,025,315 A | 5/1977 | Mazelli | |
| 4,032,337 A | 6/1977 | Boyer | |
| 4,120,911 A | 10/1978 | Davidson | |
| 4,128,410 A | 12/1978 | Bacon | |
| 4,183,369 A | 1/1980 | Thomas | |
| 4,187,689 A | 2/1980 | Selcukoglu et al. | |
| 4,294,274 A | 10/1981 | LeRoy | |
| 4,318,723 A | 3/1982 | Holmes et al. | |
| 4,334,902 A | 6/1982 | Paradowski | |
| 4,359,871 A | 11/1982 | Strass | |
| 4,370,150 A | 1/1983 | Fenstermaker | |
| 4,453,956 A | 6/1984 | Fabbri et al. | |
| 4,479,533 A | 10/1984 | Persson et al. | |
| 4,479,536 A | 10/1984 | Lameris | |
| 4,522,636 A | 6/1985 | Markbreiter et al. | |
| 4,561,496 A | 12/1985 | Kehrer | |
| 4,609,390 A | 9/1986 | Wilson | |
| 4,611,655 A | 9/1986 | Molignoni | |
| 4,654,522 A | 3/1987 | Gornick et al. | |
| 4,798,242 A | 1/1989 | Kito et al. | |
| 4,822,393 A | 4/1989 | Markbreiter et al. | |
| 4,846,862 A | 7/1989 | Cook | |
| 4,869,313 A | 9/1989 | Fredley | |
| 4,970,867 A | 11/1990 | Harron et al. | |
| 4,993,485 A | 2/1991 | Gorman | |
| 5,003,782 A | 4/1991 | Kucerija | |
| 5,032,143 A | 7/1991 | Ritakallio | |
| 5,036,671 A | 8/1991 | Nelson et al. | |
| 5,062,270 A | 11/1991 | Haut et al. | |
| 5,174,796 A | 12/1992 | Davis et al. | |
| 5,218,832 A | 6/1993 | Woolley | |
| 5,291,736 A | 3/1994 | Paradowski | |
| 5,327,730 A | 7/1994 | Myers et al. | |
| 5,375,422 A | 12/1994 | Butts | |
| 5,379,832 A | 1/1995 | Dempsey | |
| 5,386,699 A | 2/1995 | Myers et al. | |
| 5,390,499 A | 2/1995 | Rhoades et al. | |
| 5,419,392 A | 5/1995 | Maruyama | |
| 5,450,728 A | 9/1995 | Vora et al. | |
| 5,473,900 A | 12/1995 | Low | |
| 5,489,725 A | 2/1996 | Minkkinen et al. | |
| 5,505,048 A | 4/1996 | Ha et al. | |
| 5,505,232 A | 4/1996 | Barclay | |
| 5,511,382 A | 4/1996 | Denis et al. | |
| 5,537,827 A | 7/1996 | Low et al. | |
| 5,551,256 A | 9/1996 | Schmidt | |
| 5,600,969 A | 2/1997 | Low | |
| 5,615,561 A | 4/1997 | Houshmand et al. | |
| 5,615,738 A | 4/1997 | Cameron et al. | |
| 5,655,388 A | 8/1997 | Bonaquist et al. | |
| 5,669,234 A | 9/1997 | Houser et al. | |
| 5,718,126 A | 2/1998 | Capron et al. | |
| 5,755,114 A | 5/1998 | Foglietta | |
| 5,755,280 A | 5/1998 | Da Costa et al. | |
| 5,799,505 A | 9/1998 | Bonaquist et al. | |
| 5,819,555 A | 10/1998 | Engdahl | |
| 5,836,173 A | 11/1998 | Lynch et al. | |
| 5,916,260 A | 6/1999 | Dubar | |
| 5,950,453 A | 9/1999 | Bowen et al. | |
| 5,956,971 A | 9/1999 | Cole et al. | |
| 5,983,665 A | 11/1999 | Howard et al. | |
| 6,023,944 A | 2/2000 | Blundell | |
| 6,041,620 A | 3/2000 | Olszewski et al. | |
| 6,085,546 A | 7/2000 | Johnston | |
| 6,085,547 A | 7/2000 | Johnston | |
| 6,105,390 A | 8/2000 | Bingham et al. | |
| 6,131,395 A | 10/2000 | Greene et al. | |
| 6,131,407 A | 10/2000 | Wissolik | |
| 6,138,473 A | 10/2000 | Boyer-Vidal | |
| 6,138,746 A | 10/2000 | Livolsi et al. | |
| 6,196,021 B1 | 3/2001 | Wissolik | |
| 6,200,536 B1 * | 3/2001 | Tonkovich et al. | 422/177 |
| 6,212,891 B1 | 4/2001 | Minta et al. | |
| 6,220,052 B1 | 4/2001 | Tate, Jr. et al. | |
| 6,220,053 B1 | 4/2001 | Hass et al. | |
| 6,250,244 B1 | 6/2001 | Dubar et al. | |
| 6,301,927 B1 | 10/2001 | Reddy | |
| 6,354,105 B1 | 3/2002 | Lee | |
| 6,367,286 B1 | 4/2002 | Price | |
| 6,370,910 B1 | 4/2002 | Grootjans et al. | |
| 6,372,019 B1 | 4/2002 | Alferov et al. | |
| 6,375,906 B1 | 4/2002 | Edlund et al. | |
| 6,378,330 B1 | 4/2002 | Minta et al. | |
| 6,382,310 B1 | 5/2002 | Smith | |
| 6,389,844 B1 | 5/2002 | Klein Nagel Voort | |
| 6,390,114 B1 | 5/2002 | Haandrikman et al. | |
| 6,397,936 B1 * | 6/2002 | Crowley et al. | 165/104.26 |
| 6,400,896 B1 | 6/2002 | Longardner | |
| 6,410,087 B1 | 6/2002 | Wilde et al. | |
| 6,412,302 B1 | 7/2002 | Foglietta | |
| 6,427,464 B1 | 8/2002 | Beaverson et al. | |
| 6,442,969 B1 | 9/2002 | Rojey et al. | |
| 6,484,533 B1 | 11/2002 | Allam et al. | |
| 6,581,409 B2 | 6/2003 | Wilding et al. | |
| 6,581,510 B2 | 6/2003 | Koch et al. | |
| 6,694,774 B1 | 2/2004 | Rashad et al. | |
| 6,742,358 B2 | 6/2004 | Wilkinson et al. | |
| 6,767,388 B2 | 7/2004 | Lecomte et al. | |
| 6,962,061 B2 | 11/2005 | Wilding et al. | |
| 7,575,624 B2 | 8/2009 | Cartwright et al. | |
| 7,591,150 B2 | 9/2009 | Turner et al. | |
| 7,594,414 B2 | 9/2009 | Wilding et al. | |
| 7,765,920 B2 | 8/2010 | Keller | |
| 2003/0196452 A1 | 10/2003 | Wilding et al. | |
| 2004/0083888 A1 | 5/2004 | Qualls | |
| 2004/0105812 A1 | 6/2004 | Tonkovich et al. | |
| 2004/0148962 A1 | 8/2004 | Rashad et al. | |
| 2004/0177646 A1 | 9/2004 | Wilkinson et al. | |
| 2005/0183452 A1 | 8/2005 | Hahn et al. | |
| 2005/0220704 A1 | 10/2005 | Morrow et al. | |
| 2005/0279132 A1 | 12/2005 | Eaton et al. | |
| 2007/0017250 A1 | 1/2007 | Turner | |
| 2007/0107465 A1 | 5/2007 | Turner et al. | |
| 2007/0137246 A1 | 6/2007 | McKellar et al. | |
| 2007/0193303 A1 | 8/2007 | Hawrysz et al. | |
| 2010/0088920 A1 | 4/2010 | LaRou | |

FOREIGN PATENT DOCUMENTS

| | | |
|---|---|---|
| EP | 1 205 721 A1 | 5/2002 |
| JP | 58-159830 | 9/1983 |
| JP | 11200817 A | 7/1999 |
| JP | 2002071861 A | 3/2002 |

| | | |
|---|---|---|
| WO | 88/00936 | 2/1988 |
| WO | 98/59206 | 12/1998 |
| WO | 03/062725 A | 7/2003 |

OTHER PUBLICATIONS

PCT International Preliminary Report on Patentability and Written Opinion for PCT/US2007/084677 dated May 28, 2009, 7 pages.

PCT International Search Report and Written Opinion for PCT/US08/68938 dated Oct. 10, 2008, 8 pages.

PCT International Preliminary Report on Patentability and Written Opinion for PCT/US2010/045321 dated Oct. 1, 2010, 6 pages.

PCT International Preliminary Report on Patentability and Written Opinion for PCT/US2008/051012 dated Aug. 27, 2009, 7 pages.

PCT International Preliminary Report on Patentability and Written Opinion for PCT/US2010/045332 dated Oct. 18, 2010, 11 pages.

U.S. Appl. No. 12/603,948, filed Oct. 22, 2009, titled, "Complete Liquefaction Methods and Apparatus," by Turner et al.

U.S. Appl. No. 12/604,139, filed Oct. 22, 2009, titled, "Natural Gas Liquefaction Core Modules, Plants Including Same and Related Methods," by Wilding et al.

U.S. Appl. No. 12/604,194, filed Oct. 22, 2009, titled, "Methods of Natural Gas Liquefaction and Natural Gas Liquefaction Plants Utilizing Multiple and Varying Gas Streams," by Wilding et al.

"A National Vision of America's Transition to a Hydrogen Economy—To 2030 and Beyond," Based on the results of the National Hydrogen Vision Meeting Washington, DC Nov. 15-16, 2001, United States Department of Energy.

Curtin University of Technology, LNG Microcell Progress Update, May 2002, Curtin/Corelab.

"Generation of Hydrogen and Transportation and Transmission of Energy Generated on the U.S. Outer Continental Shelf to Onshore," (Minerals Management Service), May 2006.

Holmes et al., "Ryan/Holmes Cryogenic Acid Gas/Hydrocarbon Separations Provide Economic Benefits for LNG Production," 7th International Conference on Liquefied Natural Gas; Jakarta, Indonesia; May 1983; Institute of Gas Technology, Session II, vol. 1, pp. 1-15.

"Hydrogen as an Energy Carrier and its Production by Nuclear Power," IAEA-TECDOC-1085, International Atomic Energy Agency, May 1999.

"Hydrogen Infrastructure Delivery, Reliability R&D Needs," Science Applications International Corporation, Prepared for U.S. Department of Energy, NETL Natural Gas & Infrastructure Reliability Program <www.netl.doe.gov/technologies/oil-gas/publications/td/Final/%20White%20Paper%20072604.pdf>.

International Search Report dated Sep. 17, 2002 (4 pages).

"The Hydrogen Economy: Opportunities, Costs, Barriers, and R&D Needs," National Academy of Engineering and Board on Energy and Environmental Systems, 2004, The National Academies Press, <http://books.nap.edu/books/0309091632/html/index.html>.

"The Hydrogen Initiative, Panel on Public Affairs," American Physical Society, Mar. 2004, <http://www.aps.org/public_affairs/popa/reports/index.cfm>.

Mott Corporation, "Porous metal solutions," Jun. 2007, 16 pages.

"Porous Metal Design Guidebook," Metal Powder Industries Federation, Princeton, NJ, <<http://www.mpif.org/designcenter/porous.pdf>>, Jun. 2007, 25 pages.

* cited by examiner

HEAT EXCHANGERS COMPRISING AT LEAST ONE POROUS MEMBER POSITIONED WITHIN A CASING

CONTRACTUAL ORIGIN OF THE INVENTION

This invention was made with government support under Contract Number DE-AC07-05ID14517 awarded by the United States Department of Energy. The government has certain rights in the invention.

CROSS-REFERENCE TO RELATED APPLICATIONS

This application is related to U.S. patent application Ser. No. 11/381,904, filed May 5, 2006, now U.S. Pat. No. 7,594,414, issued Sep. 29, 2009; U.S. patent application Ser. No. 11/383,411, filed May 15, 2006, now U.S. Pat. No. 7,591,150, issued Sep. 22, 2009; U.S. patent application Ser. No. 11/674,984, filed Feb. 14, 2007; U.S. patent application Ser. No. 11/536,477, filed Sep. 28, 2006, now U.S. Pat. No. 7,637,122, issued Dec. 29, 2009; U.S. patent application Ser. No. 11/560,682, filed Nov. 16, 2006; and U.S. patent application Ser. No. 09/643,420, filed Aug. 23, 2001, now U.S. Pat. No. 6,425,263, issued Jul. 30, 2002, which is a continuation of U.S. patent application Ser. No. 09/212,490, filed Dec. 16, 1998, now U.S. Pat. No. 6,105,390, issued Aug. 22, 2000, which claims benefit of U.S. Provisional Application No. 60/069,988 filed Dec. 16, 1997, the disclosures of which are hereby incorporated herein in their entirety by this reference.

This application is also related to U.S. patent application Ser. No. 12/603,948 filed Oct. 22, 2009; U.S. patent application Ser. No. 12/604,139, filed Oct. 22, 2009; U.S. patent application Ser. No. 12/604,194, filed Oct. 22, 2009; U.S. patent application Ser. No. 12/648,659, filed Dec. 29, 2009, which is a continuation of U.S. patent application Ser. No. 11/536,477; U.S. patent application Ser. No. 12/938,761, filed Nov. 3, 2010; U.S. patent application Ser. No. 12/938,826, filed Nov. 3, 2010; and U.S. patent application Ser. No. 12/938,967, filed Nov. 3, 2010

FIELD OF THE INVENTION

The invention relates generally to heat exchangers and methods associated with the use thereof. More specifically, embodiments of the invention relate to heat exchangers including a porous member therein configured to convey a fluid therethrough. Embodiments of the invention additionally relates to the methods of heat transfer between fluids, the sublimation of solid particles within a fluid, and the conveyance of fluids.

BACKGROUND

The production of liquefied natural gas is a refrigeration process that reduces the mostly methane ($CH_4$) gas to a liquid state. However, natural gas consists of a variety of gases in addition to methane. One of the gases contained in natural gas is carbon dioxide ($CO_2$). Carbon dioxide is found in quantities around 1% in most of the natural gas infrastructure found in the United States, and in many places around the world the carbon dioxide content is much higher.

Carbon dioxide can cause problems in the process of natural gas liquefaction, as carbon dioxide has a freezing temperature that is higher than the liquefaction temperature of methane. The high freezing temperature of carbon dioxide relative to methane will result in solid carbon dioxide crystal formation as the natural gas cools. This problem makes it necessary to remove the carbon dioxide from the natural gas prior to the liquefaction process in traditional plants. The filtration equipment to separate the carbon dioxide from the natural gas prior to the liquefaction process may be large, may require significant amounts of energy to operate, and may be very expensive.

Small-scale liquefaction systems have been developed and are becoming very popular. In most cases, these small plants are simply using a scaled down version of existing liquefaction and carbon dioxide separation processes. The Idaho National Laboratory has developed an innovative small-scale liquefaction plant that eliminates the need for expensive, equipment intensive, pre-cleanup of the carbon dioxide. The carbon dioxide is processed with the natural gas stream, and during the liquefaction step the carbon dioxide is converted to a crystalline solid. The liquid/solid slurry is then transferred to a separation device that directs a clean liquid out of an overflow, and a carbon dioxide concentrated slurry out of an underflow.

The underflow slurry is then processed through a heat exchanger to sublime the carbon dioxide back into a gas. In theory, this is a very simple step. However, the interaction between the solid carbon dioxide and liquid natural gas produces conditions that are very difficult to address with standard heat exchangers. In the liquid slurry, carbon dioxide is in a pure or almost pure sub-cooled state and is not soluble in the liquid. The carbon dioxide is heavy enough to quickly settle to the bottom of most flow regimes. As the settling occurs, piping and ports of the heat exchanger can become plugged as the quantity of carbon dioxide builds. In addition to collecting in undesirable locations, the carbon dioxide has a tendency to clump together making it even more difficult to flush through the system.

The ability to sublime the carbon dioxide back into a gas is contingent on getting the solids past the liquid phase of the gas and into a warmer section of a device without collecting and clumping into a plug. As the liquid natural gas is heated, it will remain at approximately a constant temperature of about $-230°$ F. (at 50 psig) until all the liquid has passed from a two-phase gas to a single-phase gas. The solid carbon dioxide will not begin to sublime back into a gas until the surrounding gas temperatures have reached approximately $-80°$ F. While the solid carbon dioxide is easily transported in the liquid methane, the ability to transport the solid carbon dioxide crystals to warmer parts of the heat exchanger is substantially diminished as liquid natural gas vaporizes. At a temperature when the moving, vaporized natural gas is the only way to transport the solid carbon dioxide crystals, the crystals may begin to clump together due to the tumbling interaction with each other, leading to the aforementioned plugging.

In addition to clumping, as the crystals reach warmer areas of the heat exchanger they begin to melt or sublime. If melting occurs, the surfaces of the crystals become sticky causing the crystals to have a tendency to stick to the walls of the heat exchanger, reducing the effectiveness of the heat exchanger and creating localized fouling. The localized fouling areas may cause the heat exchanger to become occluded and eventually plug if fluid velocities cannot dislodge the fouling.

In view of the shortcomings in the art, it would be advantageous to provide a heat exchanger and associated methods that would enable the effective and efficient sublimation of solid particles therein. Additionally, it would be desirable for a heat exchanger and associated methods to be able to effectively and efficiently mix, heat, cool and/or convey fluids containing sticky, corrosive, and/or reactive chemicals.

BRIEF SUMMARY OF THE INVENTION

In accordance with one embodiment of the invention a heat exchanger is provided. The heat exchanger includes a chamber having an inlet and a porous member comprising walls having a plurality of pores in fluid communication with the chamber, an inlet and an outlet. The inlet and the outlet of the porous member each provide an opening therein substantially larger than a pore diameter of each of the plurality of pores.

In accordance with another embodiment of the invention, a method is provided for the conveyance of a fluid. The method includes conveying a first fluid into a porous member comprising a porous wall through a first inlet to direct the flow near a centerline of the porous member. Contact between the first fluid and the porous wall is reduced by forming a positive flow boundary layer along the inside of the porous wall. The positive flow boundary layer may be formed by conveying a second fluid into the porous member through the porous wall. Both the first fluid and the second fluid are conveyed out of the porous member through an outlet.

In accordance with a further embodiment of the invention, a method is provided for sublimating solid particles. The method includes conveying a first fluid comprising a chemical in a solid particulate form into a porous member by directing the first fluid through an inlet. The chemical is heated within the porous member by directing a heated second fluid through a porous wall of the porous member into the porous member and mixing the first fluid and the heated second fluid. The chemical is then conveyed out of the porous member through an outlet thereof in a gaseous form by directing the first fluid and the second fluid therethrough.

DETAILED DESCRIPTION OF THE INVENTION

Figure 1:
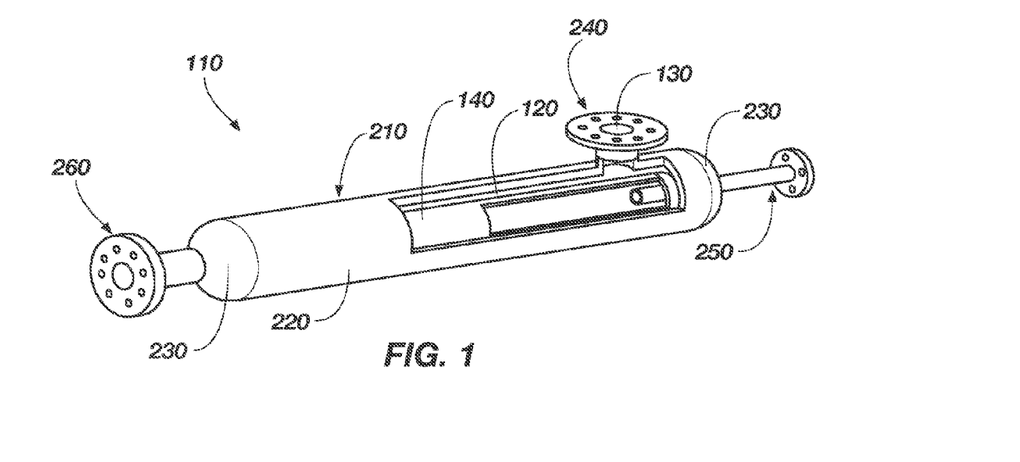
FIG. 1 depicts a partial cut-away view of a heat exchanger according to an embodiment of the present invention.

FIG. 1 illustrates a partial cut-away view of a heat exchanger 110 according to an embodiment of the present invention. It is noted that, while operation of embodiments of the present invention is described in terms of the sublimation of carbon dioxide in the processing of natural gas, the present invention may be utilized for the sublimation, heating, cooling, and mixing of other fluids and for other processes, as will be appreciated and understood by those of ordinary skill in the art.

The term "fluid" as used herein means any substance that may be caused to flow through a conduit and includes but is not limited to gases, two-phase gases, liquids, gels, plasmas, slurries, solid particles, and any combination thereof.

Figure 2A:
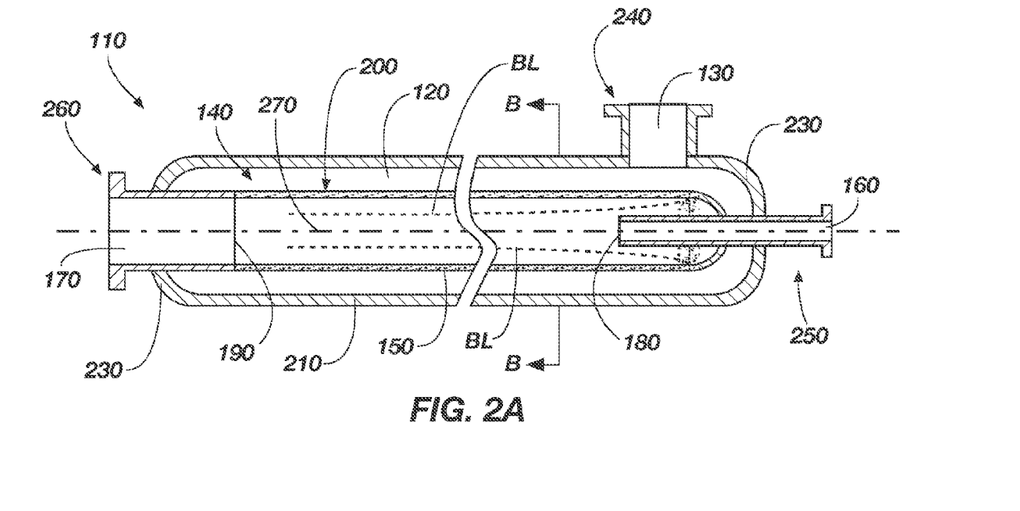
FIG. 2A depicts a longitudinal cross-sectional view of the heat exchanger shown in FIG. 1.

As shown in FIGS. 1 and 2A, the heat exchanger 110 may comprise a porous member 140 and a chamber 120 having an inlet 130. The porous member 140 comprises a porous wall 150 that may extend along at least a portion of the length of the porous member 140, an inlet 160, and an outlet 170. The porous wall 150 has a plurality of pores therethrough, and the plurality of pores may provide fluid communication between an interior of porous member 140 and the chamber 120. The inlet 160 of porous member 140 comprises a first opening 180 in the porous member 140 and the outlet 170 thereof comprises a second opening 190 in the porous member 140, each of the openings 180 and 190, respectively, being substantially larger than each of the plurality of the pores in the porous wall 150. The openings 180 and 190 may each be substantially larger in cross-sectional area than the cross-sectional area of each of the plurality of the pores in the porous wall 150.

For example, an embodiment of the heat exchanger 110 may include an inlet and an outlet that each comprise a circular opening. The diameter of each of the first and second openings 180 and 190 may be at least 10,000 percent larger than a pore diameter of each of the plurality of pores. In additional embodiments of the heat exchanger 110, the inlet and outlet openings 180 and 190 may comprise any one of a variety of shapes having a similar size ratio of pore size to the first and second opening 180 and 190 size. Additionally, the cross-sectional area of the first opening 180 may be smaller than the cross-sectional area of the second opening 190.

The porous member 140 may be formed from metal powder particles using conventional powder metallurgy techniques. For example, the porous wall 150 may comprise a porous metal pipe 200, such as is available from Mott Corporation, Farmington, Conn. One example of a suitable metal for porous wall 150 is a 300-series stainless steel, such as 304L stainless steel or 316L stainless steel. The porous member 140 may be formed such that the pores are substantially uniform throughout the porous wall 150. The term "pores" as used herein is the open volume within the porous wall 150 material matrix or network. The porous wall 150 may also have a substantially uniform interconnected porosity therethrough. The term "interconnected porosity" as used herein describes pores that are connected together and to the surfaces of the porous wall 150 to allow fluid to flow from one side of porous wall 150 to the other. In contrast, "isolated pores" do not have connectivity to both surfaces to allow fluid flow. The porous wall 150 of the porous member 140 may be tailored with a specific porosity, such that the permeability of the porous wall 150 may be tailored for a specific use. This may be accomplished by varying the pore shape, the pore size, the pore distribution, the thickness of porous wall 150, and other characteristics of the porous wall 150 material. For example, the pore diameter may be varied from 0.01 to 500 micrometers. The term "pore diameter" as used herein is defined by the diameter of the largest hard spherical particle that may pass through the interconnected porosity.

The chamber 120 may be formed within a casing 210 that surrounds the porous member 140. The casing 210 may be generally cylindrical in shape and may be formed from a pipe 220 having closed ends 230. For example, the casing 210 may be formed from a stainless steel pipe 220. As shown in FIG.

Figure 2B:
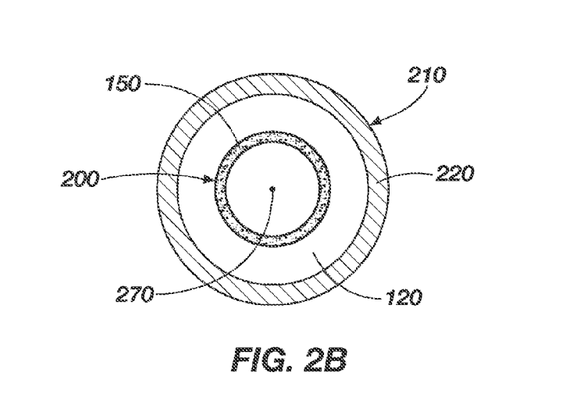
FIG. 2B depicts a transverse cross-sectional view of the heat exchanger shown in FIG. 1.

2A, the casing 210 may be sealingly coupled to an inlet fitting 240 to provide inlet 130. For example, the inlet fitting 240 may be arc welded or brazed to the casing 210. The porous member 140 may be located substantially coaxial to the casing 210. As shown in FIGS. 2A and 2B, the inner wall of the casing 210 and the outer wall of the porous member 140 may generally configure the chamber 120 in the form of an annulus. Optionally, the chamber 120 may include an outlet fitting (not shown) that may be used for maintenance and cleaning of the heat exchanger 110 and that may be closed during the regular operation of the heat exchanger 110.

The porous wall 150 of the porous member 140 may be sealingly coupled with an inlet fitting 250 and an outlet fitting 260. The inlet and outlet fittings 250 and 260, respectively, may also be sealingly coupled with the casing 210, allowing the chamber 120 to be pressurized. For example, the inlet fitting 250 and the outlet fitting 260 may be arc welded or brazed to the porous wall 150 and to the casing 210.

Figure 3:
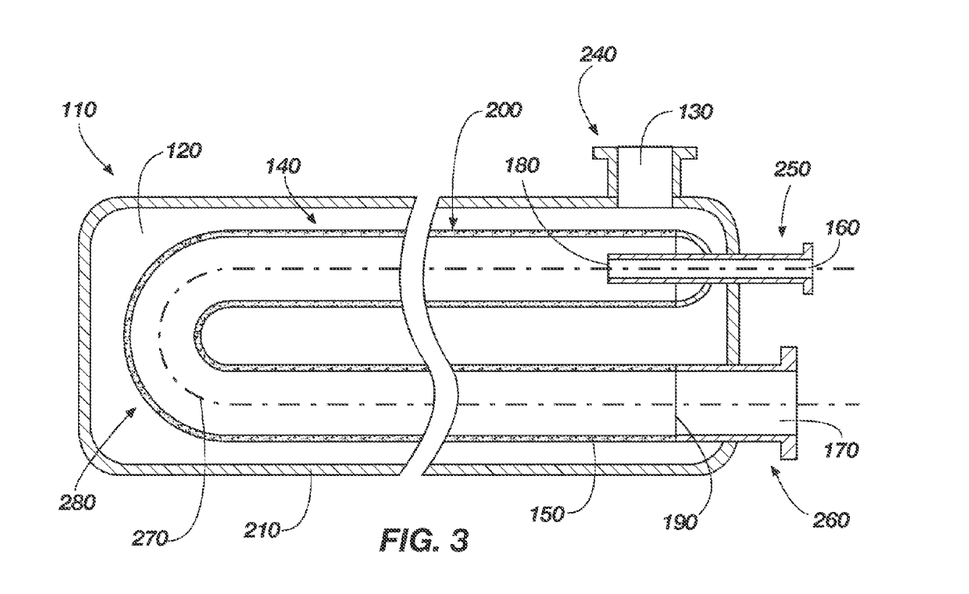
FIG. 3 depicts a longitudinal cross-sectional view of a heat exchanger that includes a porous pipe having a bend therein according to an embodiment of the present invention.
Figure 4:
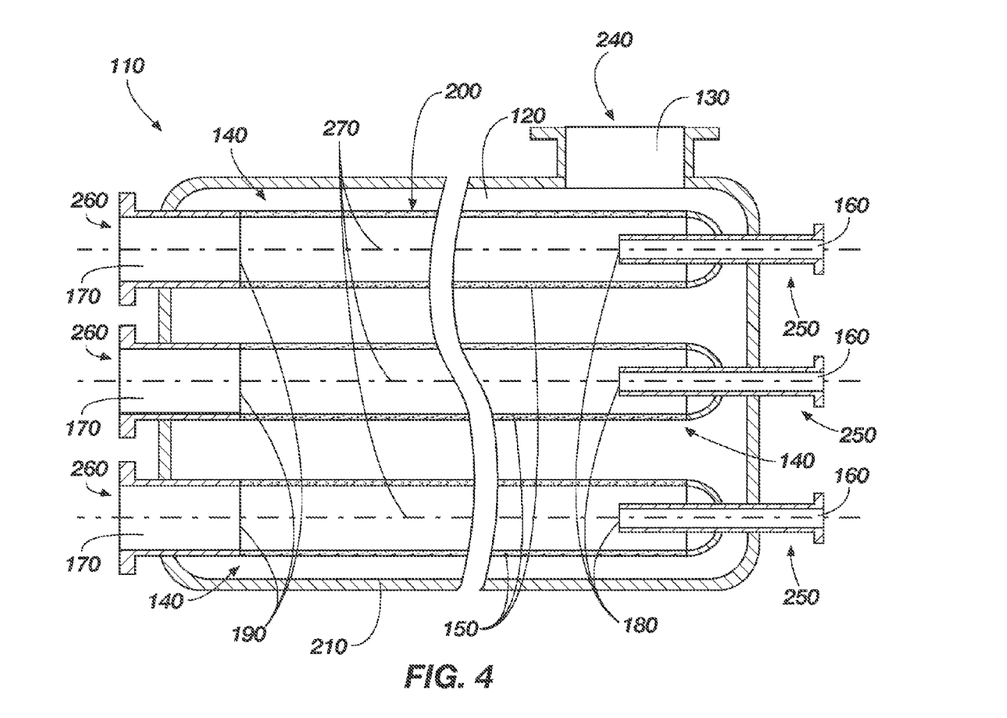
FIG. 4 depicts a longitudinal cross-sectional view of a heat exchanger that includes multiple porous members according to an embodiment of the present invention.

The porous member 140 may be generally formed with an axis that may define a centerline 270 through the porous member 140. In another embodiment, illustrated in FIG. 3, the porous member 140 may include one or more bends 280 with a curving centerline 270. In yet another embodiment, such as illustrated in FIG. 4, the heat exchanger 110 may incorporate a plurality of porous members 140, each having a centerline 270 defined therethrough. The centerline 270 may pass through the center of each cross-sectional area, each cross-sectional area defined by the porous wall 150 within the porous member 140 at a reference plane that is perpendicular to the average flow direction therethrough.

Forming the porous member 140 with one or more bends 280 and/or employing a plurality of porous members 140 may allow flexibility in the manufacture of the heat exchanger 110. The flexibility in manufacture may facilitate flexibility in the size and shape of the heat exchanger 110 as well as flexibility in the locations of inlets 130 and 160 and the outlet 170. This may facilitate the manufacture of the heat exchanger 110 to fit within a limited floor space and may allow for an efficient flow design for a processing plant incorporating heat exchanger 110.

Figure 5:
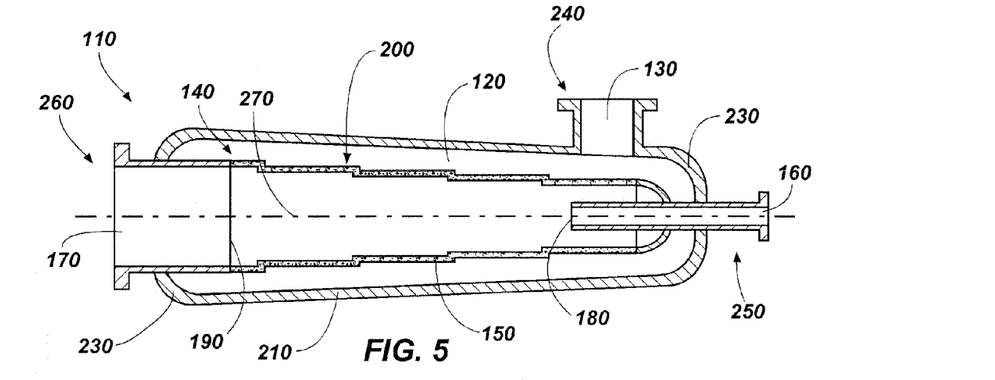
FIG. 5 depicts a longitudinal cross-sectional view of a heat exchanger that includes a porous member having a stepped taper according to an embodiment of the present invention.
Figure 6:
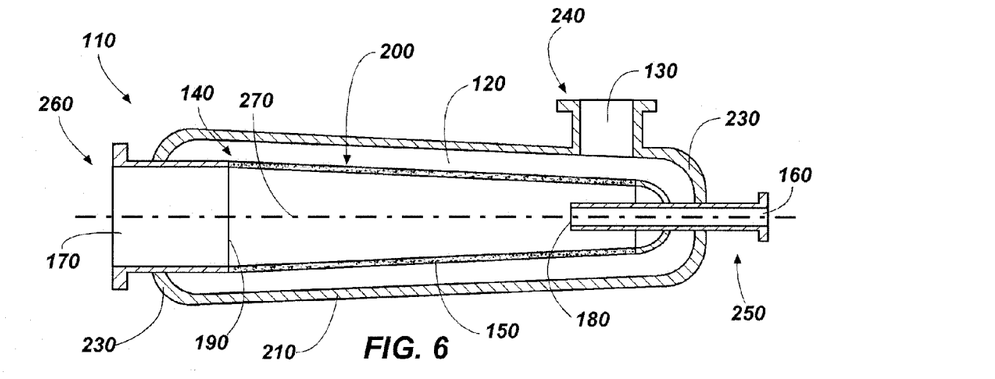
FIG. 6 depicts a longitudinal cross-sectional view of a heat exchanger that includes a porous member having a substantially continuous taper according to an embodiment of the present invention.

In an additional embodiment, the heat exchanger 110 may be configured with a porous member 140 that has a varying cross-sectional area, as shown in FIGS. 5 and 6. For example, the porous member 140 may comprise a porous pipe 200 that is tapered, having an internal cross-sectional area near the inlet 160 smaller than an internal cross-sectional area near the outlet 170. The cross-sectional area may vary substantially continuously along a length of the porous pipe 200, or may vary at steps along the length of the porous pipe 200. An example of a step-tapered porous pipe 200 is shown in FIG. 5, and an example of a substantially continuously tapered porous pipe 200 is shown in FIG. 6.

The cross-sectional area of the porous member 140 may affect flow conditions within the porous member 140. For example, as fluid enters the porous member 140 from chamber 120 through the porous wall 150, the mass flow rate through the porous member 140 will increase along the length of the porous member 140. If the cross-sectional area of the porous member 140 remains constant as the flow rate increases, the velocity of the flow will increase (assuming that there is little additional compression of the fluid). If it is desired to control the flow velocity within the porous member 140, the cross-sectional area of the porous member 140 may be varied along its length to affect the flow velocity. For example, the cross-sectional area of the porous member 140 may be increased along its length such that the velocity of the flow may be relatively constant throughout the porous member 140.

Figure 7A:
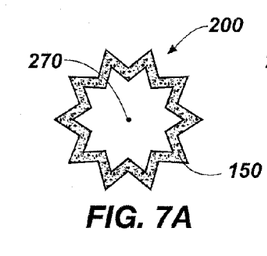
FIGS. 7A-7E depict transverse cross-sectional views of porous members according to embodiments of the present invention.
Figure 7B:
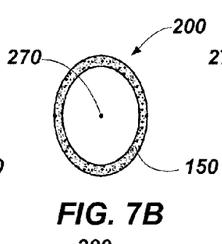
Figure 7C:
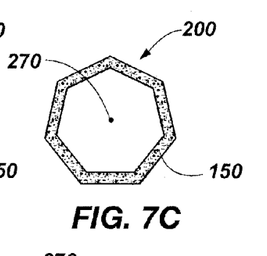
Figure 7D:
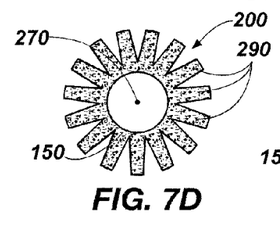
Figure 7E:
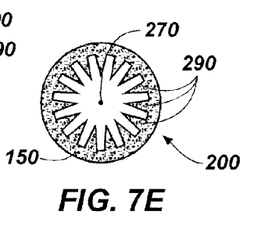

In additional embodiments, the porous pipe 200 may have an annular cross-section as illustrated in FIG. 2B, or may have a cross-section of any variety of shapes. For example, the cross-section of the porous pipe 200 may be, in transverse cross-section, of star-shaped, polygonal, elliptical, finned, or a combination thereof, as illustrated in FIGS. 7A-7E. The shape of the porous pipe 200 may be tailored for specific uses. For example, the porous pipe 200 may be formed with a substantially uniform porous wall 150 thickness to facilitate uniform flow. The porous pipe 200 may also be formed in shapes such as a star (as shown in FIG. 7A), an ellipse (as shown in FIG. 7B), or a polygon (as shown in FIG. 7C) to provide a larger surface area than a circular shape. A larger surface area may provide additional interconnected porosity to the porous member 140, which may allow more fluid to flow through the porous wall 150 at a specific pressure gradient. Additionally, the porous pipe 200 may be formed having a non-uniform porous wall 150 thickness to affect fluid flow through the porous wall 150, to affect heat transfer through the porous wall 150, to affect fluid flow within the porous member 140, or a combination thereof. For example, the porous wall 150 may have a complex shape using a combination of geometries such as fins 290 located outside the porous pipe 200 (as shown in FIG. 7D), or inside the porous pipe 200 (as shown in FIG. 7E).

In one embodiment, the heat exchanger 110 may be used to melt, vaporize, and/or sublime a solid particle suspended in a carrier fluid to convert the solid particle to a gaseous state. For example, solid carbon dioxide crystals suspended in natural gas may be sublimed within the porous member 140. The heat exchanger 110 may be especially useful for such an application as it may operate to reduce or even prevent contact between sticky carbon dioxide crystals and the porous wall 150 of the porous member 140, which may prevent fouling.

In another embodiment, the heat exchanger 110 may be operated by conveying a first fluid through the porous member 140. The first fluid may be conveyed into the porous member 140 through the first inlet 160 to direct the flow approximately along the centerline 270 of the porous member 140. A positive flow boundary layer may be formed along the inside of the porous wall 150 by conveying a second fluid into the porous member 140 through the porous wall 150. This may prevent or reduce contact between the first fluid and the porous wall 150 of the porous member 140. Both the first fluid and the second fluid may then be conveyed out of the porous member 140 through the outlet 170.

Additionally, the heat exchanger 110 may be used to provide heat transfer between a first fluid and a second fluid. The first fluid may be conveyed at a first temperature through the first inlet 160 into the interior of the porous member 140, while the second fluid may be at a second temperature substantially different than the first temperature of the first fluid and conveyed through a second inlet 130 into the chamber 120. For example, the second fluid may be heated to the second temperature prior to being conveyed into the chamber 120. The second fluid may then be conveyed from the chamber 120 into the interior of porous member 140 through the porous wall 150. The first fluid and the second fluid may mix within the porous member 140 and heat may be transferred between the first fluid and the second fluid. The first fluid and the second fluid may then be conveyed out of the porous member 140 through the outlet 170, both at a third temperature different than the first and the second temperatures.

In this embodiment, the present invention may be used as part of a liquefaction process for natural gas. For example, the present invention may be used in conjunction with an apparatus for the liquefaction of natural gas and methods relating to the same, such as described in U.S. Pat. No. 6,962,061 to Wilding et al., the disclosure of which is incorporated herein in its entirety by reference. The methods of liquefaction of natural gas disclosed in the Wilding patent include cooling at least a portion of a mass of natural gas to form a slurry which comprises at least liquid natural gas and solid carbon dioxide. The slurry is flowed into a hydrocyclone and forms a thickened slush of solid carbon dioxide in liquid natural gas. The thickened slush is discharged from the hydrocyclone through an underflow while the remaining portion of the liquid natural gas is flowed through an overflow of the hydrocyclone.

In this embodiment of the invention, the first fluid comprises a continuous flow of a thickened slush or slurry including liquid natural gas and solid carbon dioxide as might be produced in a method according to the Wilding patent, as it is conveyed into the porous member 140 through an inlet 160. The inlet 160 may direct the first fluid into the porous member 140 near the centerline 270 of the porous member 140. As the first fluid is directed into the porous member 140 through the inlet 160, a second fluid that comprises a continuous flow of heated gas, in this example (such as heated natural gas or heated methane), enters the interior of porous member 140 through the porous wall 150. The flow of the second fluid through the porous wall 150 may be induced by a pressure gradient between the chamber 120 and the interior of the porous member 140. For example, the pressure inside of the porous member 140 may be about 1-100 psid less than the pressure of the chamber 120. In one example, the pressure inside the porous member 140 may be about 25 psid less than the pressure of the chamber 120.

The second fluid may enter the porous member 140 uniformly through the porous wall 150 and create a positive flow boundary layer along the entire inside surface of the porous wall 150 of the porous member 140. The first fluid entering the porous member 140 through the inlet 160 may be constrained from contacting the inside surface of the porous wall 150 of the porous member 140 by the flow of the second fluid entering the porous member 140 through the porous wall 150. The substantially constant flow of the second fluid flowing through the porous wall 150 may facilitate the suspension of the solid carbon dioxide away from the porous wall 150 even as the first fluid is conveyed through a bend 280 in the porous member 140. This may allow any number of bends 280 or other non-linear configurations of the porous member 140 while maintaining a free flow of fluid near the centerline 270 of the porous member 140. However, in some embodiments the positive flow boundary layer may not fully constrain the first fluid from contacting the porous wall 150, but may only reduce the degree of contact between the first fluid and the porous wall 150. If, for example, carbon dioxide crystals were to adhere to a portion of the porous wall 150, the continuous flow of the heated first fluid through the porous wall 150 may heat the carbon dioxide crystals that adhere to the porous wall 150. The heating of the carbon dioxide crystals will result in the melting or sublimation of the crystals, which may cause the crystals to release from the porous wall 150 or cause the carbon dioxide to fully transition to a gaseous form. This may reduce the amount of localized fouling that may occur within the heat exchanger 110 at a given time, and may allow the first fluid to continuously flow through the heat exchanger 110 during the operation thereof.

As the first fluid is conveyed through the porous member 140, the initial heat energy provided by the second fluid may be used to facilitate a phase change of the liquid methane of the first fluid to gaseous methane. As this transition occurs, the temperature of the first fluid may remain at about −230° F. (this temperature may vary depending upon the pressure of the fluid) until all of the liquid methane of the first fluid is converted to gaseous methane. At this point, the solid carbon dioxide of the first fluid may now be suspended in the combined gaseous methane of the first and second fluids and may begin to sublime when the temperature of the combined fluids has reached about −80° F. (this temperature may vary depending upon the pressure of the fluid environment). As the temperature required to sublime the carbon dioxide is higher than the vaporization temperature of the methane, the solid carbon dioxide will be suspended in gaseous methane while the carbon dioxide changes phases from solid to vapor. As the first fluid is conveyed through the porous member 140, all of the carbon dioxide of the first fluid may be converted to gaseous carbon dioxide. After the carbon dioxide has been converted to gaseous form, the combined first and second fluid exits the porous member 140 through the outlet 170.

In one example, the first fluid may enter the porous member 140 through the inlet 160 at about 76 psia and about −226° F. at a mass flow rate of about 660 lbm/hr. The second fluid may enter the chamber 120 at about 100 psia and about 157° F. at a mass flow rate of about 1520 lbm/hr, passing through the porous wall 150 of porous member 140 to the interior of porous member 140. The combined first and second fluids may exit the porous member 140 through the outlet 170 at about −70° F. and about 75 psia at a mass flow rate of about 2180 lbm/hr.

The heat exchanger 110 may be designed for a wide variety of applications and in any number of sizes and configurations, as depicted in the various embodiments described herein. In designing the heat exchanger 110 for a specific application, the porosity of the porous wall 150 of the porous member 140 may be determined by the surface area of the porous wall 150 and the desired flow rate through the pores at a given difference in pressure between the chamber 120 and the inside of the porous member 140. Additionally, the size of the porous member 140 may be determined by the mass flow rate and the amount of heat transfer needed to ensure the gas exiting porous member 140 is at the desired temperature. The relationships between the flow rate, permeability, pressure, and various fluid and material properties may be expressed as follows.

$$\Delta P = K \cdot Q \cdot \mu \cdot X$$

Where $\Delta P$ is the difference in pressure between the chamber 120 and the porous member 140, K is the permeability coefficient of the porous wall 150 that varies with the porosity, Q is the flux or mass flow rate through the porous wall 150, $\mu$ is the viscosity of the fluid that is passing through the porous wall 150, and X is the thickness of the porous wall 150.

A desirable diameter for the porous pipe 200 may be determined by the fluid flow rate as the first and second fluids are conveyed through and out of the porous member 140.

The configuration and orientation of the porous member 140 may affect the flow of the fluid through the porous member 140, especially if the fluid contains solid particles, such as solid carbon dioxide. The particles may be drawn downward by gravity, and so it may be desirable to orient the porous member 140 such that the fluid flow through the porous member 140 is mostly horizontal. A horizontally oriented flow may cause solid particles to be conveyed within the porous member 140 at a velocity similar to the gases and/or liquids within which the solid particles are suspended.

In light of the above disclosure it will be appreciated that the apparatus and methods depicted and described herein enable the effective and efficient conveyance and sublimation of solid particles within a fluid. The invention may further be useful for a variety of applications other than the specific examples provided. For example, the described apparatus and methods may be useful for the effective and efficient mixing, heating, cooling, and/or conveyance of fluids containing sticky, corrosive, and/or reactive chemicals.

While the invention may be susceptible to various modifications and alternative forms, specific embodiments of which have been shown by way of example in the drawings and have been described in detail herein, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A heat exchanger, comprising:
   a casing;
   at least one porous member positioned within the casing, the at least one porous member comprising:
      a porous wall comprising an inner wall defining an interior of the at least one porous member, the interior of the at least one porous member surrounded by the inner wall, and an outer wall, the outer wall of the porous wall and an inner wall of the casing defining a chamber therebetween, the porous wall further comprising a plurality of pores exhibiting interconnected porosity therethrough providing fluid communication between the interior of the at least one porous member and the chamber;
      an inlet comprising a first opening into the interior of the at least one porous member, the first opening substantially larger than each of the plurality of pores; and
      an outlet comprising a second opening into the interior of the at least one porous member, the second opening substantially larger than each of the plurality of pores and positioned such that fluid may flow from the inlet to the outlet through the interior of the at least one porous member without passing through the plurality of pores of the porous wall; and
   an inlet through the casing into the chamber.

2. The heat exchanger of claim 1, wherein a size of each of the first opening and the second opening is at least 10,000 percent larger than a size of each of the plurality of pores.

3. The heat exchanger of claim 2, wherein a diameter of each of the first opening and the second opening is at least 10,000 percent larger than a pore diameter of each of the plurality of pores.

4. The heat exchanger of claim 2, wherein a cross-sectional area of the first opening is smaller than a cross-sectional area of the second opening.

5. The heat exchanger of claim 1, wherein the at least one porous member comprises a porous pipe.

6. The heat exchanger of claim 5, wherein the at least one porous member comprises a porous metal pipe.

7. The heat exchanger of claim 5, wherein at least a porous portion of the porous pipe has an internal cross-sectional area proximate the inlet smaller than an internal cross-sectional area proximate the outlet.

8. The heat exchanger of claim 7, wherein the porous pipe comprises at least one tapered porous pipe.

9. The heat exchanger of claim 5, wherein the porous pipe has at least one bend.

10. The heat exchanger of claim 1, wherein the at least one porous member comprises a plurality of porous members.

11. The heat exchanger of claim 1, wherein the chamber is located within the casing substantially laterally surrounding the at least one porous member and is of annular configuration.

* * * * *

UNITED STATES PATENT AND TRADEMARK OFFICE
CERTIFICATE OF CORRECTION

PATENT NO. : 8,061,413 B2
APPLICATION NO. : 11/855071
DATED : November 22, 2011
INVENTOR(S) : Terry D. Turner et al.

It is certified that error appears in the above-identified patent and that said Letters Patent is hereby corrected as shown below:

On the title page:
In ITEM (75) Inventors, (Line 6): change "Bruce M Wilding," to --Bruce M. Wilding,--

Above ITEM (74) *Attorney, Agent or Firm,*
(Line 23): after "*Primary Examiner* – Melvin Jones" insert
--*Assistant Examiner* – Justin Loffredo--

Signed and Sealed this
Twenty-fourth Day of September, 2013

Teresa Stanek Rea
*Deputy Director of the United States Patent and Trademark Office*